United States Patent [19]

Saeman

[11] 4,455,762
[45] Jun. 26, 1984

[54] GLASS BATCH PELLET PRODUCTION AND DRYING PROCESS AND APPARATUS

[75] Inventor: Walter C. Saeman, Cleveland, Tenn.

[73] Assignee: Olin Corporation, New Haven, Conn.

[21] Appl. No.: 373,460

[22] Filed: Apr. 30, 1982

Related U.S. Application Data

[60] Division of Ser. No. 244,457, Mar. 16, 1981, Pat. No. 4,349,366, which is a continuation-in-part of Ser. No. 123,153, Feb. 21, 1980, Pat. No. 4,293,324.

[51] Int. Cl.³ .............................................. F26B 9/06
[52] U.S. Cl. ..................................... 34/170; 34/172; 34/178; 222/276; 414/147; 414/216; 414/288
[58] Field of Search .................... 34/56, 167, 171, 172, 34/168, 178; 222/244, 276; 414/147, 216, 287, 328, 288

[56] References Cited

U.S. PATENT DOCUMENTS

| | | | |
|---|---|---|---|
| Re. 29,622 | 5/1978 | Lange | 65/27 |
| 2,148,946 | 2/1939 | Hubmann et al. | 34/168 |
| 3,149,983 | 9/1964 | Maris et al. | 106/52 |
| 3,451,831 | 6/1969 | Miche | 106/52 |
| 3,833,137 | 9/1974 | Mathews | 34/168 |
| 3,953,190 | 4/1976 | Lange | 65/335 |
| 4,026,691 | 5/1977 | Lovett et al. | 65/27 |
| 4,045,197 | 8/1977 | Tsai et al. | 65/27 |
| 4,238,216 | 12/1980 | Nevard | 65/134 |
| 4,248,615 | 2/1981 | Seng et al. | 65/27 |
| 4,248,616 | 2/1981 | Seng et al. | 65/335 |

Primary Examiner—Larry I. Schwartz
Attorney, Agent, or Firm—Ralph D'Alessandro; Donald F. Clements; Thomas P. O'Day

[57] ABSTRACT

In a rotary apparatus for the production of layered glass batch pellets there is provided a dryer for final drying of the pellets prior to their being fed to a melting furnace.

5 Claims, 15 Drawing Figures

GLASS BATCH PELLET PRODUCTION AND DRYING PROCESS AND APPARATUS

This is a division of application Ser. No. 244,457, filed Mar. 16, 1981, now U.S. Pat. No. 4,349,366, which is a continuation-in-part of Ser. No. 123,153, filed Feb. 21, 1980, now U.S. Pat. No. 4,293,324.

BACKGROUND OF THE INVENTION

This invention relates generally to the production of pellets used in the manufacture of glass and specifically to the process and apparatus utilized to dry pellets of agglomerated sand, limestone, and sodium carbonate or sodium hydroxide solutions utilized as preheated glass furnace feed.

Glass such as soda-lime glass is produced by reacting and melting sand, soda ash, and limestone or dolomite and other glass batch ingredients in a furnace to form a homogeneous melt. The use of sodium carbonate in the glass batch introduces dust particles which are entrained in furnace gases. On contact with lining materials in the furnace, sodium carbonate dust particles accelerate the attack of the refractory materials resulting in increased maintenance costs. One method known to suppress $Na_2CO_3$ dust formation is to add water to the glass batch prior to its being fed to the furnace. This water must be evaporated in the high temperature atmosphere of the furnace and results in a curtailment of furnace melting capacity and an increase in fuel consumption per unit of glass produced.

An improvement is obtained by the substitution of solutions of sodium hydroxide for water and a portion of the sodium carbonate used. U.S. Pat. No. 3,149,983 issued Sept. 22, 1964, to L. Maris et al describes the use of caustic soda with soda ash in the production of glass making batches containing sand. Glass batches produced by this method have a tendency to cake and result in handling difficulties.

South African Patent Application No. 69-6971 by C. A. Sumner teaches the preparation of agglomerated glass batch ingredients in a rotary drum having rods to develop a falling curtain of particles onto which a caustic soda solution is sprayed. Similarly, British Pat. No. 1,282,868 issued July 26, 1972, to F. G. West-Oram teaches the production of a glass batch in pellet form from sand, limestone, and caustic soda in a rotary dryer with flights. The pellets formed are heated to remove water and to accelerate the reaction of the caustic soda with the sand.

Agglomerates prepared by the processes of South African Application No. 69-6971 and British Pat. No. 1,282,868 as well as agglomerates produced in disk-type pelletizing apparatus are formed in sequential pelletization and drying stages where caustic in the interior of the pellet is not completely carbonated. Such pellets are, therefore, hygroscopic and permit segregation of the soluble $Na_2O$ component during drying. These properties result in handling and storage problems and lead to non-homogeneous compositions of the molten glass.

The function of a drying step in the pelletization process is generally to remove water supplied during the pelletizing process from the individual pellets. The drying process generally strengthens the pellets enabling them to withstand the rigors of handling and transport, as well as providing a better melting characteristic. However, the drying of pellets or the heating of solid agglomerates prior to feeding to a melting furnace, such as that utilized in glass making, presents a number of difficulties. Exposing moist pellets to higher temperatures during an uncontrolled drying process can result in crumbling, smearing, or exploding of the pellets. This breakdown of the pellets may be due to excessive strain induced by high thermal gradients within the agglomerated material or to excessive internal pressures such as occurs with super-heated steam where the rate of water volatilization exceeds the rate of vapor diffusion to the internal pores of the individual pellets. Disintegration of the pellets normally occurs because the heat transfer rates to the interior of the pellets are in excess of the water vapor diffusion rates to the exterior. This normally results in the explosion of the pellets.

An additional problem to maintaining pellet integrity occurs when pellets are formed where crystalline sodium carbonate monohydrate ($Na_2CO_3.H_2O$) serves as a bonding agent. Crystalline sodium carbonate monohydrate has the apparent tendency to weaken as a bonding agent in a glass pellet batch at temperatures above a specific temperature range because of the release of the water of hydration. This weakens the monohydrate bonding within the individual pellets. Above this predetermined range the bond reforms as the pellet dries due to the evaporation of the water of hydration. At temperatures above this sensitive temperature range, anhydrous carbonate serves as a bonding agent to bond the pellets so that no substantial amount of pellet degradation occurs. However, within this sensitive temperature range the pellets suffer substantial degradation if they are subjected to continuous or appreciable impingement against dryer flighting and each other or to continuous mechanical movement during the final drying and preheating process.

In contrast, the very slow heating and drying of pellets results in very slow rates of water volatilization wherein the evaporation is normally restricted to the outer surface of the pellets. This allows the soluble components combined with the water to migrate to the surface of the pellet, thereby producing a heterogeneous composition from the surface inwardly. This latter is especially unacceptable for pellets used in the manufacture of glass since the more easily fusible soda-rich layer on the outside flows away from the pellet during fusion in the glass furnace and leaves a more refractory silica core which melts more slowly. Such a process causes defects in the quality of glass produced because of the differences in density and viscosity.

The foregoing problems are solved in the design of the process and apparatus of the present invention by providing a static bed dryer that minimizes pellet agitation and carefully controls pellet bed and drying and heating gas temperature differentials. The process and apparatus is utilizable with rotary pelletizing apparatus or any other appropriate apparatus which produces agglomerated glass batch ingredients in pelletized form for dehydration and preheating prior to the pellets being fed to a melting furnace.

SUMMARY OF THE INVENTION

It is an object of the present invention to provide in a process for producing pelletized glass furnace feed from mixtures of sand, limestone, and solutions of sodium carbonate or sodium hydroxide a static bed-type dryer which may be utilized to dehydrate and heat the pellets.

It is another object of the present invention to provide a process and apparatus in which relatively cool moist pellets are fed into a static bed-type dryer to form a uniformly distributed pellet bed while a heating and drying gas is directed into the dryer in such a manner that the gas flows countercurrent to the direction of travel of the pellets through the dryer to maintain a temperature differential between the gas and the surface of the solid pellets in the bed throughout the bed's entire height in the range of approximately 5° F. to 120° F. and, ideally, within approximately 50° F.

It is a further object of the present invention to provide a grate mechanism or system for supporting the pellet bed in the static bed-type dryer that controls the transport rate of the bed of pellets from the top of the dryer to the bottom uniformly across the entire cross-section of the bed.

It is another object of the present invention to employ feed distribution apparatus at the top of the dryer to ensure uniform distribution of the cool moist feed pellets over the top of the pellet bed.

It is a feature of the present invention that controlled heating rates of the pellets in a static bed-type dryer is accomplished by gravitating the bed of pellets slowly from the top toward the bottom in counter-current contact with the heating and drying gas.

It is another feature of the present invention that the temperature differential between the heating and drying gas and the surface of the solid pellets is sufficiently restricted to limit the heat transfer rate to the solid pellets so that pellet explosions and degradation from internal pressure buildup is avoided.

It is an advantage of the present invention that the static bed-type dryer is simple and inexpensive in operation.

It is another advantage of the present invention that the drying and heating of the pellets occurs within a sufficiently extended time period to prevent thermal spalling or pellet degradation from internal pressure buildup while the water vapor volatilization is sufficiently controlled to prevent internal pressure buildup and resultant explosion of the pellets.

These and other objects, features, and advantages are obtained in the process for the production of glass batch feed pellets by providing a static bed-type dryer for the dehydration and drying of pellets that ensures uniform progression of the bed of pelletized agglomerated material down through the dryer and a uniform bed depth of the pellets over the cross-section of the thermal treatment zone of the dryer, while maintaining a temperature differential between the surface of the solid pellets and the heating and drying gas of between 20° F. and 120° F. and ideally 50° F.

BRIEF DESCRIPTION OF THE DRAWINGS

The advantages of this invention will become apparent upon consideration of the following detailed disclosure of the invention, expecially when it is taken in conjunction with the accompanying drawings wherein.

DETAILED DESCRIPTION OF THE PREFERRED EMBODIMENT

Figures 1, 2, 6, 7:
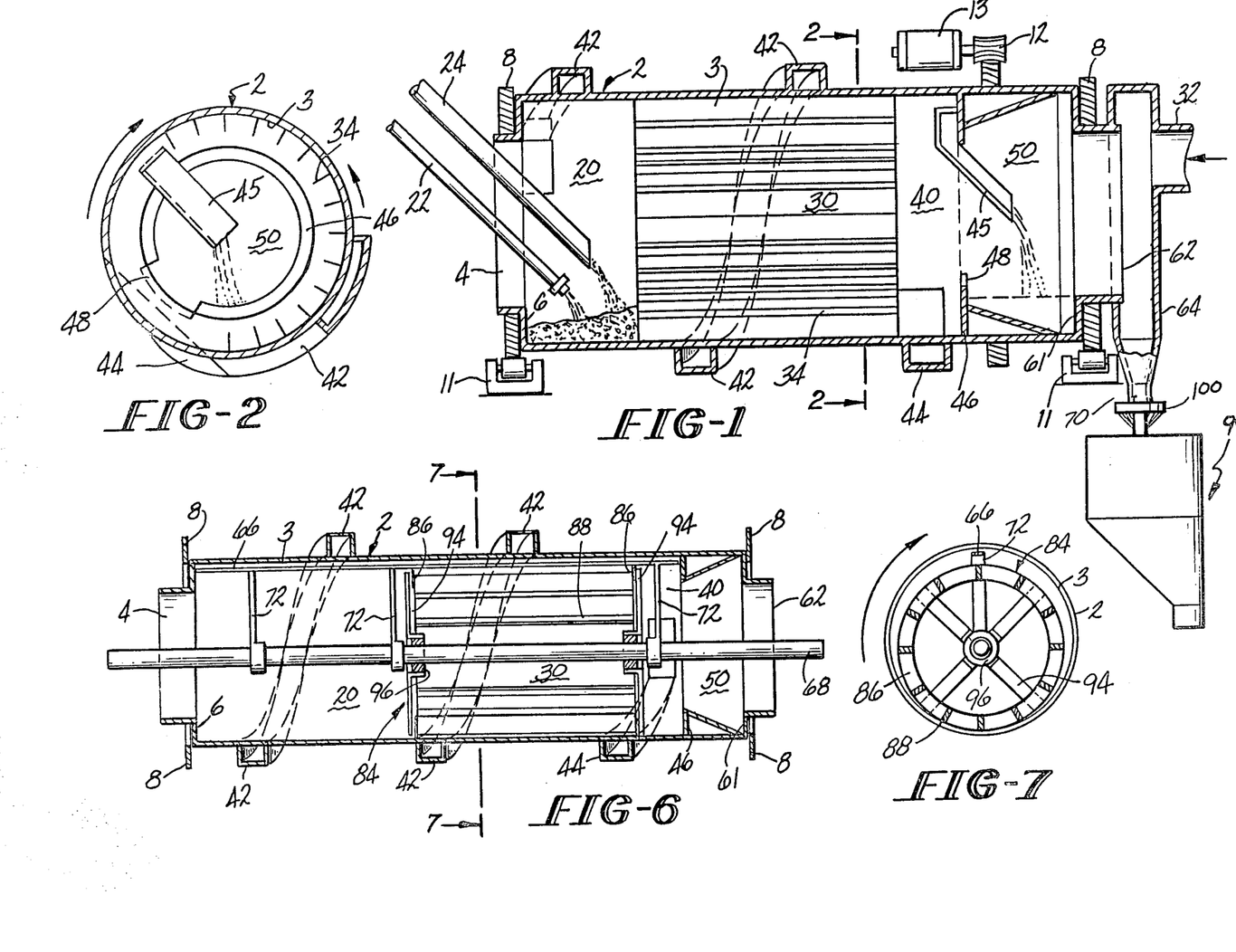
FIG. 1 is an elevational view in section of the rotary apparatus which may be used in practicing the present invention.
FIG. 2 is a cross-sectional view taken along the lines 2—2 of FIG. 1.
FIG. 6 is an elevational view in section of an additional alternate embodiment of the rotary apparatus which may be used in practicing the present invention.
FIG. 7 is a radial cross section taken along line 7—7 of FIG. 6.

Referring to the drawings, and in particular FIG. 1, the rotary apparatus of the present invention includes generally a hollow cylindrical shell 2 having an inner wall 3, a feed end 4, and a discharge end 62. Two riding rings 8 are mounted on the external peripheral surface thereof. Shell 2 is mounted for rotation about its axis of elongation with the riding rings 8 riding on trunnion roll assemblies 11. Shell 2 is rotated by suitable ring gear and pinion drive 12 by motor 13. The axis of rotation may be tilted slightly from the horizontal with the discharge end 62 being the lower. Suitable end thrust rollers (not shown) may be provided, as well known in the art, to limit axial movement of shell 2.

Feed end 4 of shell 2 is open. The aperture diameter of end plate 6 is smaller than the shell diameter to prevent spillage of the bed out of the feed end. A liquid inlet 22 and a dry feed chute 24 extend through opening 4 into the interior of shell 2.

A stationary end housing 64 encloses the discharge end 62 of shell 2. End housing 64 is provided with gas duct 32.

Shell 2 contains a plurality of functional zones. The first zone is a pelletizing zone 20 into which are fed solid feed materials through dry feed chute 24 and liquid feeds through liquid inlet 22. Recycled feed particles are introduced into pelletizing zone 20 through recycle spiral conveyor 42 surrounding the exterior surface of shell 2.

Adjacent to pelletizing zone 20 is drying zone 30. Drying zone 30 contains at least one set of circumferentially spaced, radially extending flights 34. Radially extending flights 34 lift moist pellets from the bed of drying zone 30 to the top of drying zone 30 and release the pellets to fall separately through the drying zone to the bed. Gas duct 32 introduces warm gases for drying the pellets. After flights 34, inner wall 3 of shell 2 is bare, forming recycle zone 40 which separates drying zone 30 from the classification zone 50.

Recycle zone 40 contains inlet 44 to spiral conveyor 42 which recycles a portion of the dried pellets to pelletizing zone 20. Another portion of the dried pellets is transported by elevator and deflector scoop 45 over dam ring 46, having adjustable gate 48, into classification zone 50.

Classification zone 50 is conically shaped with the smaller diameter adjacent to recycle zone 40. Dried pellets are fed from recycle zone 40 by elevator and deflector scoop 45 to the center of classification zone 50. Small pellets flow back towards recycle zone 40 and are readmitted to recycle zone 40 through adjustable gate 48 in dam ring 46. Larger pellets flow towards discharge end 62. Large pellets overflow end plate 61 and enter discharge end 62 into end housing 64. From end housing 64, the dried pellets are discharged through opening 70.

As shown in FIG. 2, a set of flights 34 encircle the inner circumference of cylindrical shell 2 in drying zone 30. Rotation of cylindrical shell 2 in a clockwise direction deposits dried pellets in inlet 44 of recycle spiral conveyor 42. Recycled pellets sliding inside recycle spiral conveyor 42 are returned to pelletizing zone 20. Elevator and deflector scoop 45 deposits dried pellets into classification zone 50 downstream from dam ring 46 having adjustable gate 48. Return of the dried pellets from classification zone 50 to recycle zone 40 is controlled by adjustable gate 48.

Figure 3:
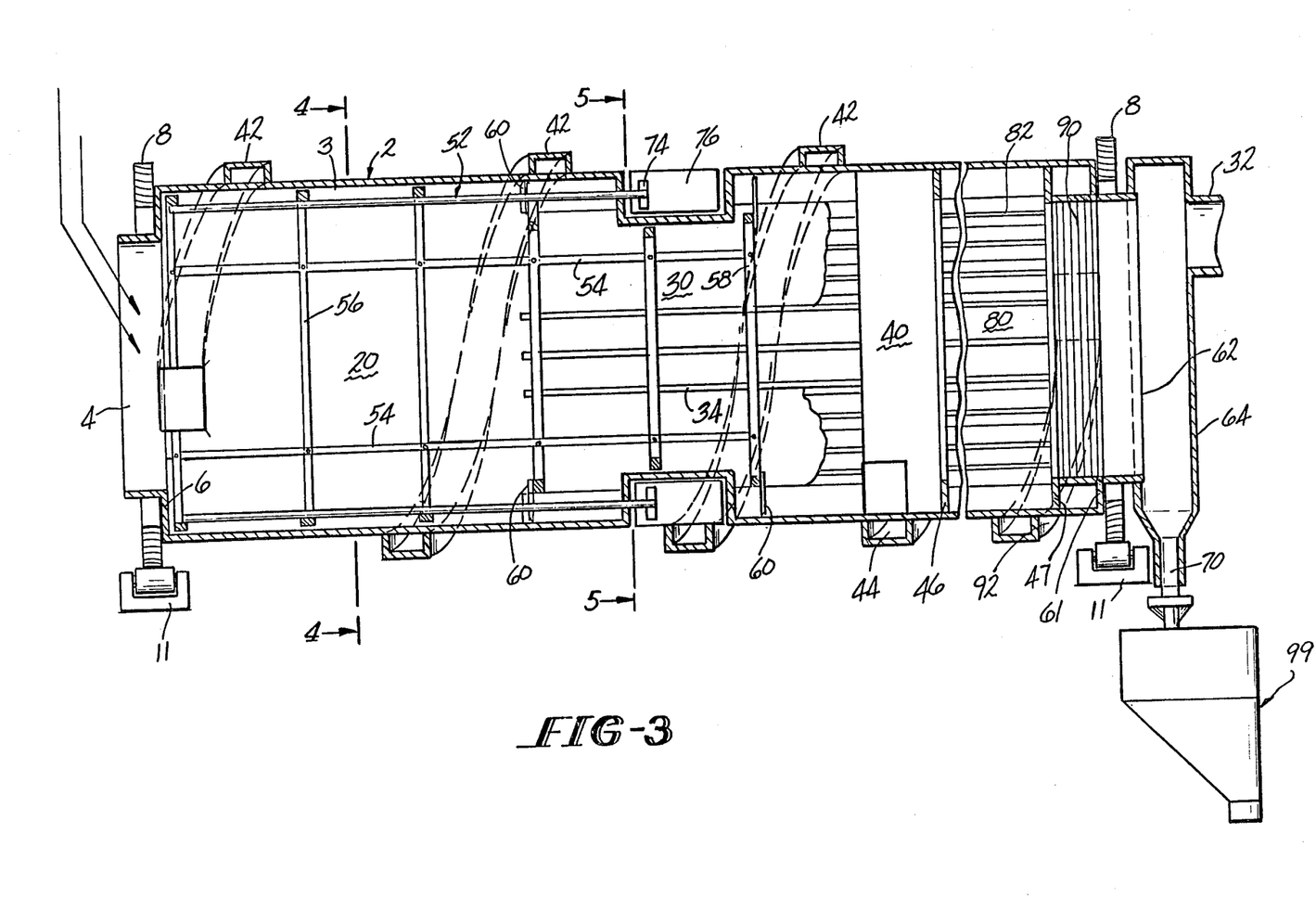
FIG. 3 is an elevational view in section of an alternate embodiment of the rotary apparatus which may be used in practicing the present invention.
Figure 4:
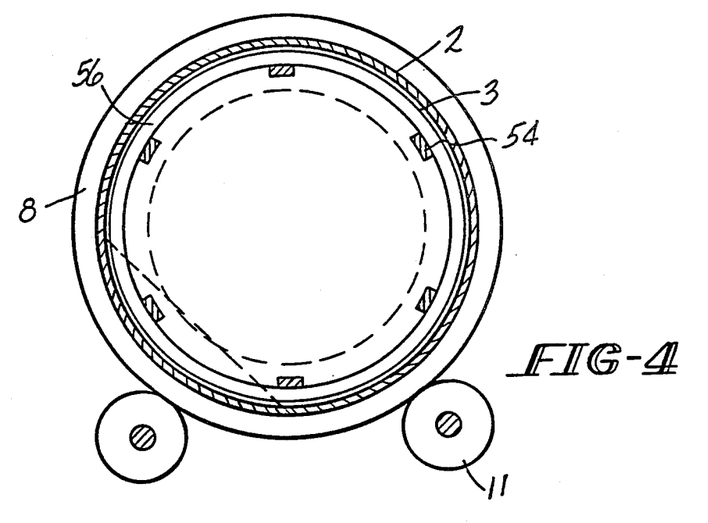
FIGS. 4 and 5 are cross-sectional views taken, respectively, along lines 4—4 and 5—5 of FIG. 3.
Figure 5:
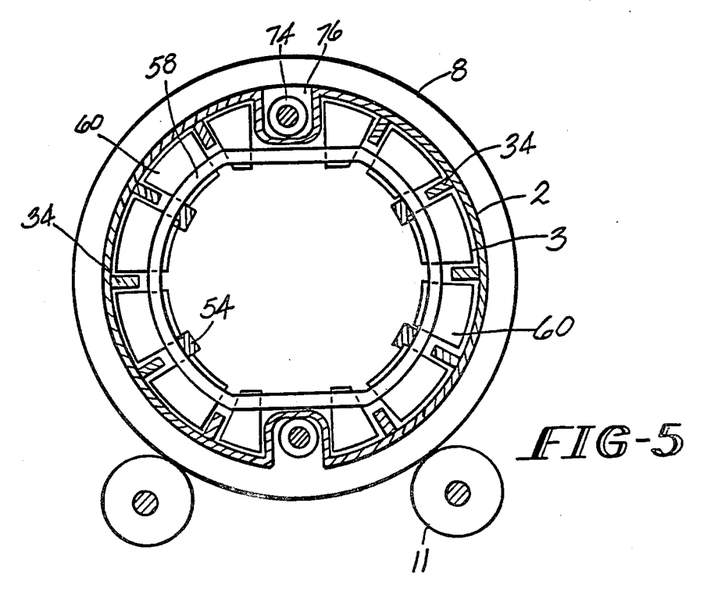

In the alternate embodiment, shown in FIGS. 3, 4, and 5, the interior surfaces in the pelletizing, drying and recycle zones are made accessible to reciprocating scraper cage 52 to limit the uncontrolled buildup of glass batch materials on these surfaces.

Reciprocating scraper cage 52 is comprised of a number of longitudinal bars or rods 54 positioned parallel to the drum axis and shorter than the combined length of pelletizing zone 20, drying zone 30, and recycle zone 40 by the length of the stroke for reciprocating scraper cage 52. Longitudinal bars 54 are formed into a rigid assembly by a series of circumferential rings 56 in pelletizing zone 20 and circumferential rings 58 in drying zone 30. Circumferential rings 56 and 58 are spaced at intervals equal to the length of the stroke of scraper cage 52. In pelletizing zone 20, the outside diameter of circumferential rings 56 is slightly less than the inside diameter of inner wall 3. As rings 56 reciprocate along the surface of inner wall 3, the maximum thickness of glass batch ingredients adhering to inner wall 3 is limited to the open clearance between circumferential rings 56 and inner wall 3. In drying zone 30, the outside diameter of circumferential rings 58 is slightly less than the inside diameter of the lips of radial extending flight 34 to allow free movement of circumferential rings 58 back and forth along the flight lips. Attached to circumferential rings 58 in drying zone 30 are blades 60 contoured to fit between adjacent radial extending flights 34 and free to move back and forth between them. Buildup of glass batch materials on the sides of flights 34 and between flights 34 is thereby dislodged by the action of blades 60 as reciprocating scraper cage 52 moves back and forth inside drying zone 30 of shell 2. At suitable intervals around the perimeter of shell 2 are located reciprocating pistons 74 driven hydraulically or pneumatically and connecting to reciprocatng scraper cage 52 to provide the motive power for the movement of the reciprocating scraper cage 52. Since circumferential rings 56 and 58 are spaced apart by the length of the stroke of cage movement, the entire surface of inner wall 3 is thereby accessible to blades 60 attached to reciprocating scraper cage 52. If required, the circumferential rings 56 and 58 can be offset or deformed to whatever extent required to avoid interference with other fixed obstructions in the interior of shell 2 such as housings 76 required to support reciprocating pistons 74 for scraper cage 52 as shown in FIGS. 3 and 5. Recycle zone 40 houses inlet 44 to spiral conveyor 42 which recycles a portion of the pellets entering from drying zone 30 to pelletizing zone 20. Pellets passing over dam ring 46 enter supplemental drying zone 80 fitted with lifter flights 82 which cascade the pellets through heated drying gases fed through gas duct 32. Supplemental drying zone 80 is employed to further reduce the moisture content of the pellets entering from recycle zone 40 prior to their being fed to trommel screen 90. The supplemental drying of the pellets prevents the buildup of moist solids on trommel screen 90 which is employed as an alternate embodiment of pellet classification. Undersized pellets and fines which pass through the openings of trommel screen 90 collect between dam ring 47 and end plate 61 and are passed through inlet 92 of spiral conveyor 42 to be recycled to pelletizing zone 20.

A further alternate embodiment of the apparatus of the present invention is illustrated in FIGS. 6 and 7 in which a full length stationary scraper blade 66 is positioned in the upper portion of cylindrical shell 2. Stationary scraper blade 66 is attached to stationary axle 68 by support bars 72. Drying zone 30 houses cylindrical flight cage 84 having an outside diameter slightly smaller than the inside diameter of cylindrical shell 2 where stationary scraper blade 66 is positioned in the intervening clearance between inner wall 3 of cylindrical shell 2 and cylindrical flight cage 84. As best illustrated in FIG. 7, cylindrical flight cage 84 has end rings 86 to which are attached radial flights 88 and support spokes 94. Support spokes 94 are also attached to hub 96. Cylindrical flight cage 84 is in frictional contact with inner wall 3 along the bottom of cylindrical shell 2 whereby cylindrical flight cage 84 rotates in the direction in which cylindrical shell 2 rotates as indicated in FIG. 7.

Referring briefly to FIGS. 1 and 3, the static bed dryer apparatus, indicated generally by the numeral 99 is seen diagramatically connected to the opening 70 in the end housing 62. It is to be understood that other intermediate apparatus, such as suitable pellet storage bins and an appropriate pellet distribution system may be positioned between the opening 70 in end housing 62 and the final dryer 99. As shown generally in FIGS. 8 and 9, the dryer 99 may have a suitable pellet distribution system connected to the opening 70 to receive the pellets and evenly distribute them across the bed of the dryer 99.

Figure 8:
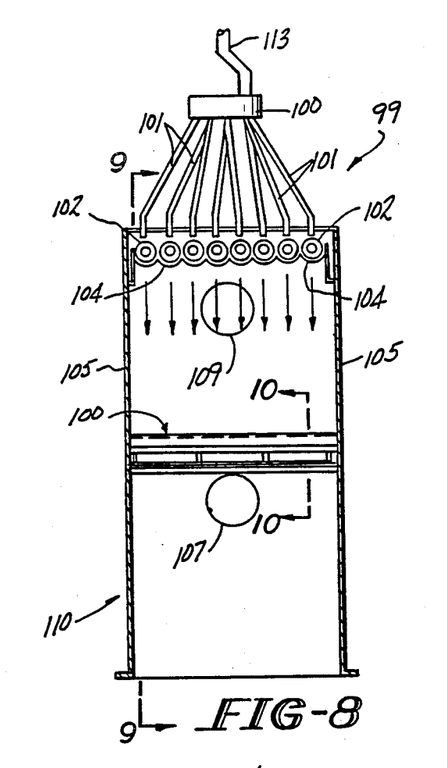
FIG. 8 is a side-elevational view of the static bed dryer apparatus showing in diagramatic detail an auger conveyor pellet distribution system.
Figure 9:
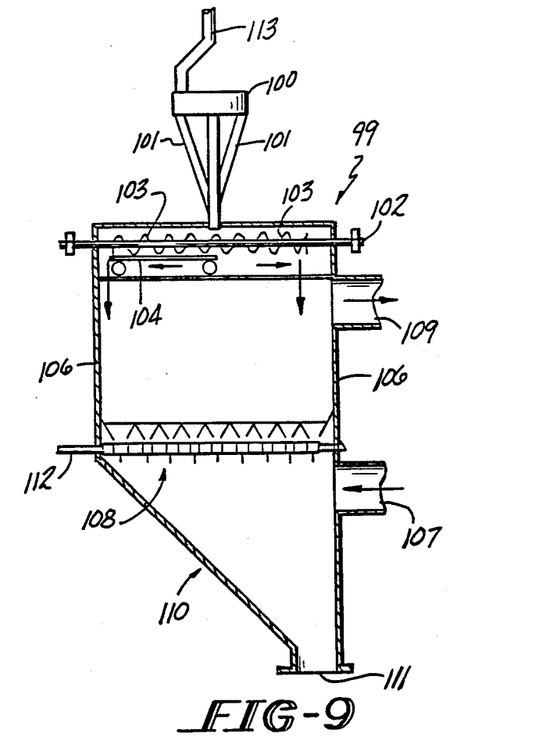
FIG. 9 is a sectional view taken along the line 9—9 of FIG. 8.

One type of a suitable pellet distribution system is shown in FIGS. 8 and 9 wherein a rotating feeder 113 conveys pellets from opening 70 to a radially partitioned feed head 100 which is diagramatically illustrated. The radially partitioned feed head 100 equally distributes the pellets through chutes 101 to a plurality of auger conveyors 102. Conveyors 102 are comprised of auger flighting 103 and auger troughs 104; the auger flighting 103 distributing the pellets through the auger troughs 104 in an appropriate fashion to ensure uniform distribution of the pellets across the pellet bed that forms therebeneath in the dryer 99. Troughs 104, for example, may be mounted for reciprocal linear movement or of any other suitable design to permit the pellets to be directed in predetermined quantities across the top of the pellet bed.

As can best be seen in FIGS. 8 and 9, dryer 99 is comprised of a frame having pairs of opposing sides 105 and 106. As best seen in FIG. 9, a warm gas infeed port 107 feeds through one side of the sides 106 to force warm gases up through the gratings, indicated generally by the numeral 108. A gas exhaust port 109 may be provided near the top of the dryer 99 or, alternately, the gases may be permitted to rise out through the open top. Pellets are permitted to exit the dryer by passing through the hopper portion indicated generally by the numeral 110 which terminates in a discharge port 111. The pellets then are discharged into a suitable receiving vessel or may be deposited directly into the glass furnace.

The gratings 108 have a handle portion 112 that extends from the side of the frame of the dryer 99 to permit the gratings to be moved laterally. The gratings 108 are seen in enlarged detail in FIG. 10.

Figure 10:
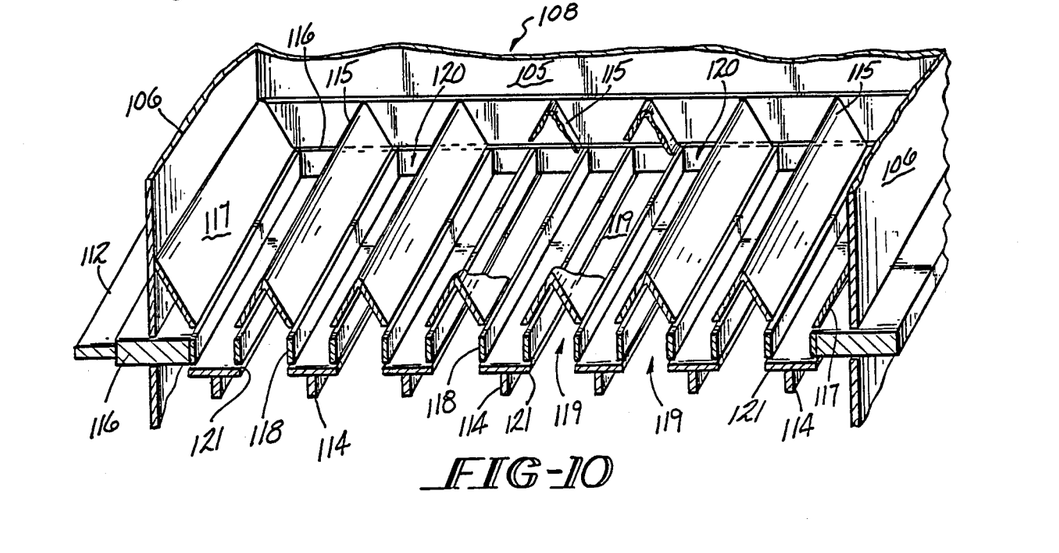
FIG. 10 is an enlarged perspective view of the grate system.

The gratings 108 have three component parts all of which are located within what is the bottom receiving area for pellets which are distributed to form a pellet bed across the gratings of the dryer by the auger conveyors 102 of the pellet distribution system. The first stationary lower grate portion 114 is seen as comprising individual T-shaped elements. Overlying the first stationary portion or lower grate 114 is a second stationary portion or upper grate 115 which comprises individual inverted V-shaped elements. These inverted V-shaped elements 115 are so shaped to facilitate the free flow of pellets downwardly through the gratings 108. Between the first stationary portion or lower grate 114 and the second stationary portion or upper grate 115 is a third movable pellet transferring portion or shuttle grate 116. The shuttle grate 116 occupies the vertical space between the upper grate 115 and lower grate 114 and is fitted with uniformly spaced vertical partitions 118 which block the pellet flow between open slots 120 in the upper grate 115 and open slots 119 in the lower grate 114. Deflectors 117 guide pellets to open slots 120.

The height of the shuttle grate 116 need not coincide with the vertical clearance between the upper grate 115 and the lower grate 114. At a minimum however, the vertical height must extend sufficiently so that the space between the top of the vertical partitions 118 is at least greater than the pellet diameter to prevent crushing pellets which could become caught between the bottom portion of upper stationary grate 115 and the top of vertical partitions 118 of the shuttle grate 116. The top surface 121 of the T-shaped lower grates 114 is flat and generally horizontal to allow for free lateral movement of the shuttle grate 116 thereacross.

Pellets are thus fed downwardly from the auger conveyors 102 and the auger troughs 104, as indicated by the arrows in FIG. 8, to form a bed across the gratings 108 of the dryer 99. The pellets initially will gravitate through the open slots 120 in the upper grate 115 and come to rest on the flat top surface 121 of the lower grate 114. The lateral flow of pellets is blocked by the vertical partitions 118 of the shuttle grate 116 thereby providing a confining and stabilizing structure to permit the bed to remain in a stable condition and build in height across the full width of the bed. At regulated time intervals, the shuttle grate 116 is then quickly shifted a lateral distance equal to the spacing between any two adjacent vertical partitions 118. This causes the pellets which were previously resting on the top surface 121 of the lower stationary grate 114 to be moved over an open slot 119 while additional pellet flow through the upper grate 114 and upper grate slots 120 is initiated to refill the vacant spaces in the shuttle grate 116 between the now relocated vertical partitions 118. The rate of downward progression of the pellet bed is thus regulated by the shifting of the shuttle grates 116 periodically at programmed time intervals or as desired.

The drying gas flow proceeds through the gas infeed port 107 and up through the gratings 108. The gas initially passes through the open slots 119 in the lower grate, through the distance between the upper and lower grates 114 and 115, respectively and then upwardly through the open slots 120 of the upper grate 115. As the heating and drying gas comes into contact with the pellets, the gas passes through the open voids between the stacked pellets. If desired, additional space for gas transmission may be provided by having small perforations or slots (not shown) in the inverted V-shaped elements of the upper grate 115.

Figure 11:
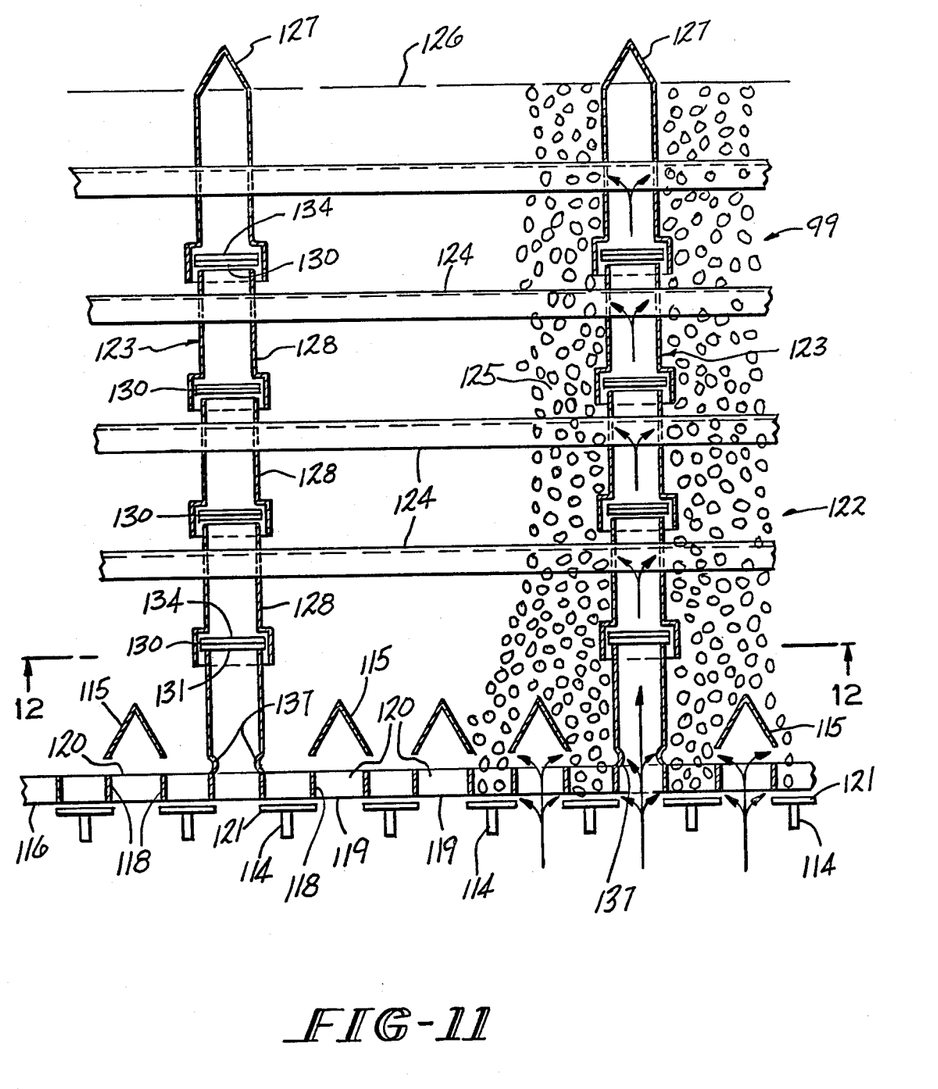
FIG. 11 is a side cross-sectional view of a gas distribution system above the grating for the static bed dryer shown in FIG. 9.

FIG. 11 shows a preferred embodiment of the invention in a side cross-sectional view of gas distribution system 122 above the gratings 108 of static bed dryer 99 of FIG. 9. At selected positions in the upper grate 115, the inverted V-shaped elements 115 are replaced by vertical hot gas ducts 123. Ducts 123 convey hot gas from the bottom of dryer 99 upwards through pellet bed 125. Ducts 123 are also used to support lateral extension ducts 124 which provide fixed channels for the lateral flow of the heating and drying gas substantially uniformly throughout solids bed 125 of dryer 99.

Upper level 126 of pellet bed 125 is at or near the top of vertical hot gas ducts 123, which are each capped with gas imprevious covers 127. Vertical hot gas ducts 123 are preferably constructed of a plurality of flanged box—like extension units 128. Lateral hot gas ducts 124 are preferably inverted V-shaped elements which may be slotted, if desired.

Lateral damper units 130 are provided to work in cooperation with vertical hot gas ducts 123 to control the rate of flow of hot gas from selected positions on the bottom of grating 108 to pellet bed 125.

Figure 12:
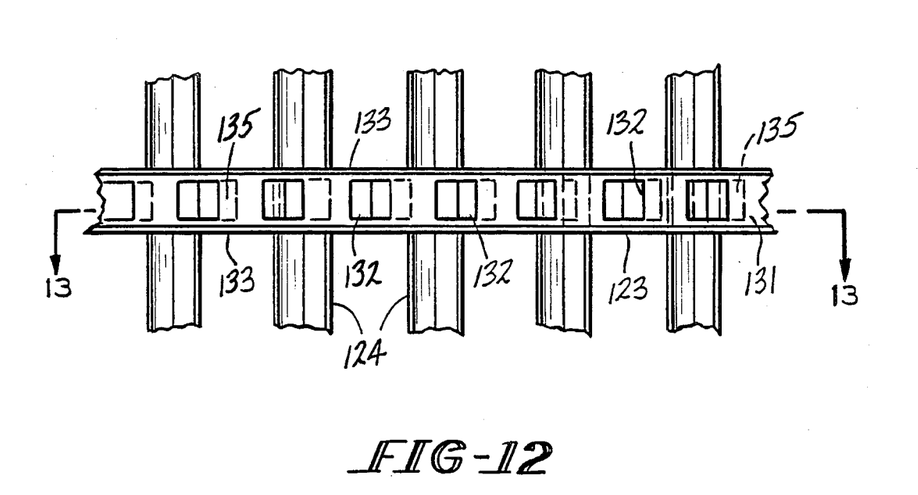
FIG. 12 is a bottom cross-sectional view, through lines 12—12 on FIG. 11 of the gas distribution system.

FIG. 12 is bottom cross sectional view of a lateral damper unit 130 through line 12—12 of FIG. 11. As shown in FIGS. 11 and 12, lateral damper units 130 are comprised of a lower fixed plate 131 provided with openings 132, which is secured to the sides of vertical hot gas ducts 123 by welding 133 or otherwise. Upper movable plate 134 is also provided with openings 135, and sliding of upper plate 134 permits matching openings 135 with openings 132 in lower plate 131 to permit a large amount of hot gas to pass through. When it is desired to reduce the gas flow rate, as indicated by an undesirable rise in temperature at a given level in pellet bed 125, upper plate 134 is moved to reduce the portion of the matching openings in the two plates and thereby reduce the flow rate of hot gases in pellet bed 125 above the adjusted damper unit 130.

Figure 13:
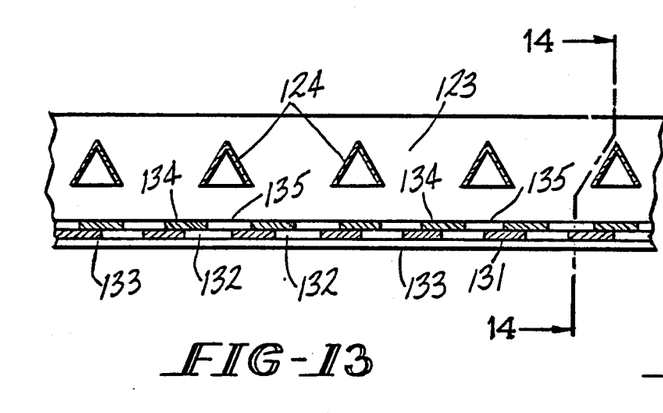
FIG. 13 is a side cross-sectional view of the gas distribution system through lines 13—13 of FIG. 12.
Figure 14:
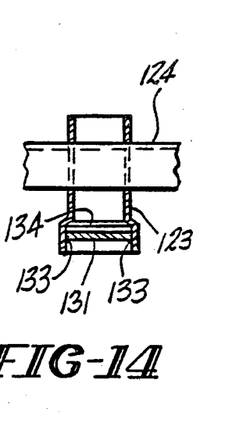
FIG. 14 is a side cross-sectional view of the gas distribution system through lines 14—14 of FIG. 13.

FIG. 13 is a side view of a lateral damper unit 130 through lines 13—13 of FIG. 12 and FIG. 14 is a side view of a lateral damper unit 130 through lines 14—14 of FIG. 13. These drawings also illustrate the operation of the lateral damper unit 130 to control the flow rate of hot gas to upper level 126 of pellet bed 125.

Although lateral damper unit 130 is shown as a sliding bar, other types of dampers, such as rotating perforated pipes and the like may be employed.

The location and number of the vertical hot gas ducts 123 will vary with the size of dryer 99. Generally a dryer having a width of about six feet will utilize about two vertical hot gas ducts spaced equidistant from dryer sides 106 and from each other. Lateral hot gas ducts 124 may be inverted V-angles which extend from dryer sides 106 through each vertical hot gas duct 123, as shown in FIG. 14. The lateral hot gas ducts 124 at each level of pellet bed 125 are substantially paralled to each other, for ease of construction, but need not be. The number and size of the lateral hot gas ducts per level will depend on the size of dryer 99, but should not exceed the numbers and size which covers more than about 25 percent of the cross sectional area of dryer 99. The distance between each level of lateral hot gas ducts 124 will depend on the dryer size but generaly is in the range from about 6 to 24 inches. The spacing between hot gas grates could be varied by appropriate selection of the height of the extension ducts and the number of hot gas ducts employed across the width of the bed.

It should be noted that the upper grate 115 with its inverted V-shaped elements is off-set from the lower grate 114 with its T-shaped members and their flat top surface portions 121. This vertical off-setting of the two grates facilitates the control of the flow of the pellets downwardly down through the pellet bed.

In the process of the present invention, glass batch pellets are formed in the pelletizing zone of the apparatus. The pellets are produced from a feed mix which includes ingredients which provide $SiO_2$, $CaO$, $MgO$, $Na_2O$, $K_2O$, and other components which may be employed in the production of glass.

Glass batch pellets produced by the process of the present invention may contain the ingredients for producing commercial silicate glasses as given, for example, in Table 3 on pages 542–543 of volume 10 of the Kirk-Othmer *Encyclopedia of Chemical Technology*, 2nd edition, 1966. This table includes compositions containing $SiO_2$, $Al_2O_3$, $B_2O_3$, $Li_2O$, $Na_2O$, $K_2O$, $MgO$, $CaO$, $PbO$ as major constituents with other ingredients listed as well, with the desired ratios employed in glass manufacture given in percent by weight. Preferred are glass batch pellets for silicate glass compositions whose principle use is for flat glass, container glass, lighting ware, laboratory ware, light bulbs, and tumblers as well as in glass fiber insulation. More preferred glass batch pellets are those whose compositions are suitable for the production of soda-lime glasses used in flat glass, containers and incandescent light bulbs or tubes. A widely employed soda-lime glass composition contains (as percent by weight) 72 percent silica, 15 percent $Na_2O$ and 10–13 percent $CaO$ (or $CaO$ and $MgO$) with perhaps minor amounts of other metal oxides.

Sand is preferably used to supply the $SiO_2$ requirements although, for example, alkali metal silicates may be employed. Any sand which is suitable for use in glass production may be employed. Sand particles are normally employed having the size distribution ranges of the natural product. Size reduction by crushing is generally not required.

The calcium carbonate source employed includes limestone, dolomite, calcium carbonate, aragonite, calcite and mixtures thereof. Mixtures of a calcium carbonate source such as limestone or dolomite with lesser amounts of burnt lime, burnt dolomite, or hydrated lime may also be used. Suitably the calcium carbonate may have a particle size corresponding to that of the sand used. Particle sizes preferred, for example, are those where about 90 percent of the particles are minus 100 mesh and smaller. Pellet formation is facilitated by using more finely comminuted-limestone or dolomite.

The $Na_2O$ requirements of the pellets are provided by employment of an aqueous solution of sodium hydroxide. Any suitable concentrations of aqueous solutions of sodium hydroxide may be fed to pelletizing zone 20. While it is preferred to use NaOH to supply the entire $Na_2O$ requirements of the glass batch mixture, as stronger pellets are obtained, it may be economically advantageous to use sodium carbonate, $Na_2CO_3$, as a partial replacement for NaOH. $Na_2CO_3$, dry or as an aqueous solution, can be employed to supply up to about 50 percent of the $Na_2O$ requirements. However, where mixtures of NaOH and $Na_2CO_3$ are used, it is preferred that the substitution of $Na_2CO_3$ for NaOH be in the range of from about 1 to about 25 percent of the $Na_2O$ requirements. It is also preferred that the $Na_2CO_3$ fed to the pelletizing zone be an aqueous solution.

In addition to these basic ingredients, the glass batch may contain a large number of additives which are commonly used in glass production such as feldspar and salt cake ($Na_2SO_4$) as well as those which supply $Fe_2O_3$, $TiO_2$, $SO_2$, and oxides of other metals of Groups III, IV, V, and VIII of the Periodic Table.

During starting operations, the moving bed may initially consist of any suitable source of chemically compatible aggregated solids in the approximate size range of the glass batch pellets to be produced. For example, silica pebbles or crushed limestone can be used initially to constitute the moving bed. As suitably sized glass batch pellets are produced, the aggregated solids in the bed are replaced.

In producing glass batch pellets by the process of the present invention, sand, the calcium carbonate source and other dry solid ingredients are fed either separately or as a blend onto a rolling or tumbling bed of recycled pellets in the pelletizing zone in suitable amounts to provide the desired ratios of $SiO_2$ and $CaO$ in the glass batch.

The sodium hydroxide solution is fed or dispersed onto the rolling or tumbling bed of recycled pellets from the recycling zone. The feed rate of the aqueous solution is controlled to wet the solid ingredients and maintain a cohesive condition between the sand, calcium carbonate source, other glass batch ingredients, and recycle pellets while providing the desired amounts of $Na_2O$. The dry glass forming solid ingredients are preferably fed onto the bed in close proximity to the caustic solution feed point. The sodium hydroxide solution is a source of soluble solids in the composition of the pellets. The sodium hydroxide solution usually contains sufficient water to form a tacky surface on the recycle pellets to which the sand and limestone particles adhere to form a new layer.

The recycle pellets used as seed particles in the pelletizing zone provide a core of sufficient strength so that the new layers of solids formed by subsequent deposition of the feed ingredients can endure drying without cracking or deformation. Water required to control the degree of wetness of the bed is normally provided in the aqueous solution of the $Na_2O$ source; however, water may also be added separately. The bed temperature may also be raised or lowered to control the rate of water evaporation.

Bed temperatures in the pelletization and drying zones are maintained within predetermined limits covering those combinations of temperature and NaOH caustic concentration for which the stable solid phase is the monohydrate of sodium carbonate, $Na_2CO_3.H_2O$ ranging from temperatures at or below approximately 110° C. at zero percent NaOH concentration to approximately 18° C. at approximately 47 percent concentration NaOH. As soon as sodium carbonate forms under conditions with temperatures greater than those at the concentrations in the monohydrate region just described, the $Na_2CO_3$ combines with a portion of the water contained within the pellet to form the crystalline monohydrate of sodium carbonate. The water of hydration of $Na_2CO_3.H_2O$ is 17% of the weight of $Na_2CO_3$. Pellets having a moisture content of more than 4% by weight carry sufficient water to allow the hydration of all of the $Na_2CO_3$ in the pellet. Sodium carbonate is formed primarily by the reaction of the NaOH with the carbonate ion of the calcium carbonate source. An additional source of sodium carbonate of lesser importance is by the absorption of $CO_2$ present in combustion gases fed to the pelletizing zone. Crystalline $Na_2CO_3.H_2O$ is also formed when water is volatilized from solutions of $Na_2CO_3$. The formation of sodium carbonate monohydrate in the pellet layer provides the desired bonding strength to the pellet.

The NaOH concentration of the residual solution in the pellets may initially be equal to that in the feed solution of NaOH. NaOH concentration declines because of reaction with the carbonate ion in the calcium carbonate source or with $CO_2$. Dilution of NaOH may also occur due to supplemental additions of water. On the other hand, the evaporation of water within the drying zone tends to increase the concentration of the NaOH. The temperature of the combustion gases in the drying zone may be increased or decreased to establish control over the bed temperature and the water evaporation rate.

When 50 percent NaOH is used as the feed concentration of the NaOH, it has been determined that the rate of reaction of the NaOH with dolomite as the calcium carbonate source is sufficiently rapid to reduce the residual NaOH concentration in the liquid phase present in the pellets to concentrations less than 30 percent. In this instance, to form crystalline $Na_2CO_3.H_2O$, the bed temperature can be allowed to reach a maximum temperature of about 60° C. On the other hand, where calcite or aragonite are used as calcium carbonate sources, the reaction was found to be somewhat slower, allowing residual concentrations of NaOH in the liquid phase in the pellets to remain near 35 percent. Under these conditions, the maximum allowable bed temperature was about 50° C. If bed temperatures exceed these maximum limits, the crystalline $Na_2CO_3.H_2O$ melts releasing the water of hydration. Bond strength provided by the crystalline monohydrate is then reduced and the pellet structure is degraded.

In further consideration of the allowable combinations of bed temperature and NaOH concentration, it has been shown that use of more dilute NaOH feed solutions allows an increase in the operating rate of the pelletizer. Thus less reaction time is needed to reduce the caustic concentration to sufficiently low values to permit bed temperatures in the range from about 50° to about 80° C., to be employed, bed temperatures which are preferred during pellet formation. These preferred bed temperatures are conducive to faster water evaporation rates required because of the use of the more dilute NaOH. The higher allowable bed temperature for dolomite as compared to calcite or aragonite as calcium carbonate sources may be attributed to the more rapid reaction of NaOH with the $MgCO_3$ in the dolomite. By similar analogies, it may also be inferred that more finely pulverized feeds of limestone or dolomite will react with the NaOH more rapidly than coarser materials, thereby allowing operation at both a higher bed temperature and also at a higher operating rate. Operation of the pelletizing zone at bed temperatures less than 50° C. is permissible with the appropriate concentrations of NaOH solutions. However, the reaction rate of NaOH with the calcium carbonate source and the water evaporation rate are both retarded and the maximum operating rate of the pelletizer is reduced.

The utilization of the relatively dilute sources of NaOH solution in the range of 10 to 30 percent allows the use of bed temperatures in the range of 60° to 100° C., suitably high to achieve an accelerated rate of reaction of the NaOH with the $CaCO_3$ or $MgCO_3$ and also provide for an equally rapid rate of volatilization of the water fed to the pelletizer with the caustic solution.

Bed transport within the rotating drum moves the moist coated seed pellets into the drying zone. Heated gas, for example, air or combustion gases, contacts the glass batch pellets to evaporate and remove water. Water in the caustic solution in excess of that required to maintain pellet residual moisture content is immediately volatilized in the drying zone. This causes the $Na_2CO_3$ formed by the reaction of NaOH with carbonate ion or $CO_2$ to crystallize and prevents the migration of the soluble $Na_2O$ components into subsequently deposited layers. Radial lifter flights installed in the drying zone lift the layered pellets to the upper portion of the drying zone and release them to fall separately through the heated gas and thus provide for controlled heat transfer. While radial flights are preferred, the drying zone may comprise a rotary kiln or contain rotary louvers.

Where the heated gas used for drying is a combustion gas, carbon dioxide is present. During the evaporation of water, absorption of carbon dioxide from the drying gases onto the newly deposited layer reacts with the NaOH and aids in the formation of crystalline bonds of sodium carbonate. This further prevents the migration of soluble soda compounds into subsequently deposited layers of feed materials onto the surface of the pellets. Carbon dioxide also reacts with calcium hydroxide $[Ca(OH)_2]$ produced during the reaction of NaOH with the calcium carbonate source, and where present, with magnesium hydroxide to form calcium carbonate and magnesium carbonate. Formation of crystalline bonds in the newly deposited layers strengthens and toughens the pellets. The formation of $Na_2CO_3$ by the reaction of NaOH with $CaCO_3$ and $MgCO_3$ or by the absorption of $CO_2$ by NaOH also neutralizes hygroscopic properties of the caustic soda.

Gases, such as air and flue gases used in drying the pellets are at temperatures in the range of from about 100° to about 300° C., and preferably from about 100° to about 200° C. Where combustion gases containing $CO_2$ are used in the drying zone, suitable amounts of $CO_2$ include those from about 1 to about 30 percent by weight of the hot gas.

The pellets are retained in the drying zone for a period sufficiently long to evaporate water in excess of that required to provide the dried pellets with the desired residual moisture content. Suitable drying times include those of from about 2 to about 20 minutes. The dried pellets have a residual moisture content in the range of from about 4 to about 12 percent, preferably from about 5 to about 9 percent and more peferably from about 6 to about 8 by weight. Residual moisture includes water of hydration and free water present in the pellet.

Dried pellets pass through the inlet of spiral recycle conveyor 42 and are returned to the pelletizing zone as recycle pellets. Also returned to the pelletizing zone through spiral recycle conveyor 42 are unagglomerated dry solids such as sand and limestone. A portion of dried layered pellets is transferred to classification zone 50 by elevator and deflector scoop 45. Scoop 45 is adjustable between a zero bed depth setting wherein the inlet end of the scoop 45 is in engagement with the internal periphery of shell 2 and a full bed depth wherein the inlet end of scoop 45 is at a height at least equal to that of adjustable gate 48.

Pellets from recycle zone 40 are deposited by elevator and deflector scoop 45 near the center of classification zone 50. In the rotating conical classification zone, the smaller pellets segregate at the smaller diameter adjacent to recycle zone 40. The flow of smaller pellets back into recycle zone 40 is regulated by adjustable gate 48. To minimize direct by-passing of small pellets and unagglomerated sand and limestone back into the classification zone, elevator and deflector scoop 45 is positioned in relation to adjustable gate 48 and conveyor inlet 44. Larger pellets deposited in classification zone 50 will move towards the larger diameter of the cone. The bed depth in the classification zone is regulated by end plate 61. Pellets overflowing this barrier enter discharge end 62 and are discharged from end housing 64 through opening 70.

Classified layered pellets exiting from classification zone 50 have a diameter of from about 1.5 to about 26 and preferably from about 3 to about 20 millimeters.

During extended periods of operation, a slow progressive rate of buildup of glass batch materials occurs on inner wall 3 within pelletizing zone 20 and drying zone 30 where contact occurs with the pelletized bed of material. This buildup is undesirable as it will ultimately reduce the operating efficiency in the pelletizing and drying zones. The buildup of glass batch materials can be limited to inconsequential amounts by use of suitably designed scraper systems. One such system is shown and described in FIG. 3. A slow rate of reciprocation of such a reciprocating scraper cage dislodges any buildup in excess of the clearance between the moving scraper surface and the surfaces of inner wall 3. The dislodged material is reincorporated in or recycled to the bed of pellets in the pelletizing zone. The freshly deposited solids forming the buildup are of a sufficiently soft texture to allow easy disengagement without reaction stress in excess of the rigidity limits of the cage assembly. In an appropriately designed cage, the unscraped inner surfaces of the scraper cage itself are of an insufficient area to cause concern for glass batch materials adhering to these surfaces.

In an alternate embodiment of the scraper blade illustrated in FIGS. 6 and 7, the buildup of solids on the walls of the apparatus is limited by a stationary scraper blade positioned close to the inner wall of the drum. Clearance for the operation of a stationary scraper blade in the drying zone is achieved by using a detached flight cage in lieu of the rigidly attached flights employed in the apparatus illustrated in FIGS. 1, 2 and 3.

In the alternate embodiment for classification of the product pellets using a trommel screen as shown in FIG. 3, the pellets from recycle zone 40 are dried further in supplementary drying zone 80 sufficiently to prevent any significant buildup of moist solids on the trommel screen wires. The buildup of solids impairs the classification of pellets by the trommel screen. Superficial drying is provided by a supplementary drying section furnished with radial flights to induce accelerated heat transfer between the hot gases and the pellets by cascade of the pellets through the hot gases. These dried pellets, having a moisture content of from about 0.1 to about 1.0 percent by weight less than pellets entering supplementary drying zone 80, then progress onto the trommel screen where "on-size" pellets continue to the discharge opening of the pelletizer drum. The undersized pellets and fines fall through the screen and are returned to pelletizing zone 20 through spiral conveyor 92 and 42.

The novel process of the present invention produces multi-layered pellets having a homogeneous cross-sectional composition from the interior to the surface. By producing pellets by the formation of thin layers (onion-skin increments) by depositing moist glass batch ingredients on a dry substrate on each pass through the recycle system, migration of soluble NaOH is prevented. The repeated recycle of the pellet through the pelletization zone and drying zone, for example, up to as many as 20 recycles, converts the major portion of NaOH in the layer to the less soluble and non-hygroscopic sodium carbonate monohydrate. This process imparts strength and hardness to the multi-layer pellet which is not attainable by the single-step procedures previously employed in preparing glass batch pellets. Because of the low concentrations of residual moisture in pellets recycled or recovered from the drying zone, dehydration and pre-heating can then be effected in a subsequent operation with no further migration of soluble soda compounds occurring. Multi-layered pellets produced by the novel process of the present invention can endure storage and handling and pre-heating treatments without excessive breakdown and dust formation.

The layered pellets for glass furnace feed in the apparatus and process of FIGS. 1–7 generally contain from about 4–8 percent by weight of water prior to the final drying step in dryer 99. However, pellets for glass furnace feed can be prepared by other techniques, such as rotating pans or discs, rotary drums and the like. Pellets prepared by the latter techniques generally contain considerably more moisture, for example from about 8 to about 20 percent by weight of water. The novel static bed dryer 99 of FIGS. 11-14 can be utilized to dry pellets for glass furnace feed prepared by a variety of techniques, including those described above, where the water content may range from about 4 to about 20 percent by weight.

In carrying out the process of this invention in the apparatus of the preferred embodiment shown in FIGS. 11-14, pellets are fed to the top of dryer 99 to fill the pellet bed 125 to the upper level 126, with shuttle grate 116 in a closed position, as shown in FIG. 11. Vertical partitions 118 match the top surfaces 121 of lower grate 114 to retain the pellets within dryer 99, as illustrated on the right side of FIG. 11. Hot gas is forced up through open slots 119 in lower grate 114 through open slots 120 in upper grate 115, and up through the pellet bed 125. Where vertical hot gas ducts 123 are positioned above open slot 120, a portion of the hot gas passes out ports 137 into the pellet bed and up to the upper level 126. The remainder of the hot gas entering the bottom of each vertical hot gas duct 123 rises towards cover 127, and as it passes each lateral hot gas duct 124, a portion of the hot gas is distributed laterally to pellet bed across ducts 124. The hot gas entering under upper grates 115 is at a relatively low temperature after it passes through pellet bed 125 and it reaches upper level 126, as it is in conventional drying techniques. However, in dryer 99, the hot gas entering the bed at any level of lateral hot gas ducts 124 is still substantially at the elevated temperatures of the feed hot gas.

As a result the gases entering the pellet bed 125 through grate members 114 and 115 which have been cooled by counter current heat transfer to lower temperature pellets will be re-heated in proportion to the hot gas flow through ducts 124 relative to the cooler gas flowrate in the pellet bed 125. An essentially uniform temperature differential between the gas and the pellets is thereby maintained.

At start-up of the novel dryer of this invention, an initial period of batch operation of the dryer is programmed to dehydrate and preheat the bed as a batch at a suitably slow rate. This batch operation is achieved by omitting bed discharge from the dryer until the pellets in the lowermost zone of the bed of pellets have been adequately dried and preheated. Hot gas flow during the initial batch operation is typically set at 20 to 60% of the normal gas flow rate for continuous operation. The temperature of the hot gas feed may also be reduced for initial startup operation. This low gas flow rate permits the heat transfer rate to the cool moist pellets to be limited to sufficiently low values to prevent explosion of the pellets during dehydration and avoid spalling or pellet disintegration during the subsequent pre-heating period of the dehydrated pellets.

After the lowermost pellets have been dehydrated and preheated at the reduced gas rate, the continuous normal operation of the dryer can commence. The grating 108 is operated to discharge preheated pellets at a programmed rate while the feed distribution mechanism utilizing the augers 102 is activated to maintain the top pellet level at a normal operating level. Concurrently the hot gas flow rate is increased to establish the desired heating level at the bottom of the pellet bed.

Additional heating gas is admitted into the pellet bed through gas distribution system 122 of FIG. 11. The vertical hot gas ducts 123 and lateral hot gas ducts 124 at higher levels in the pellet bed maintain the desired differential temperatures between the gas and pellets within a specified control range typically ranging from a minimum value of about 5° F. to a maximum differential not exceeding 120° F. and generally not more than 100° F. The temperature differential must be sufficient to induce sufficient heat transfer over the dehydrating zone of the pellet bed to volatize the water in the pelletized feed. Lateral dampers 130 are adjusted to give the damper settings which maintain this desired temperature differential, in response to the amount of water that must be volatized from the pellets within the dryer.

Figure 15:
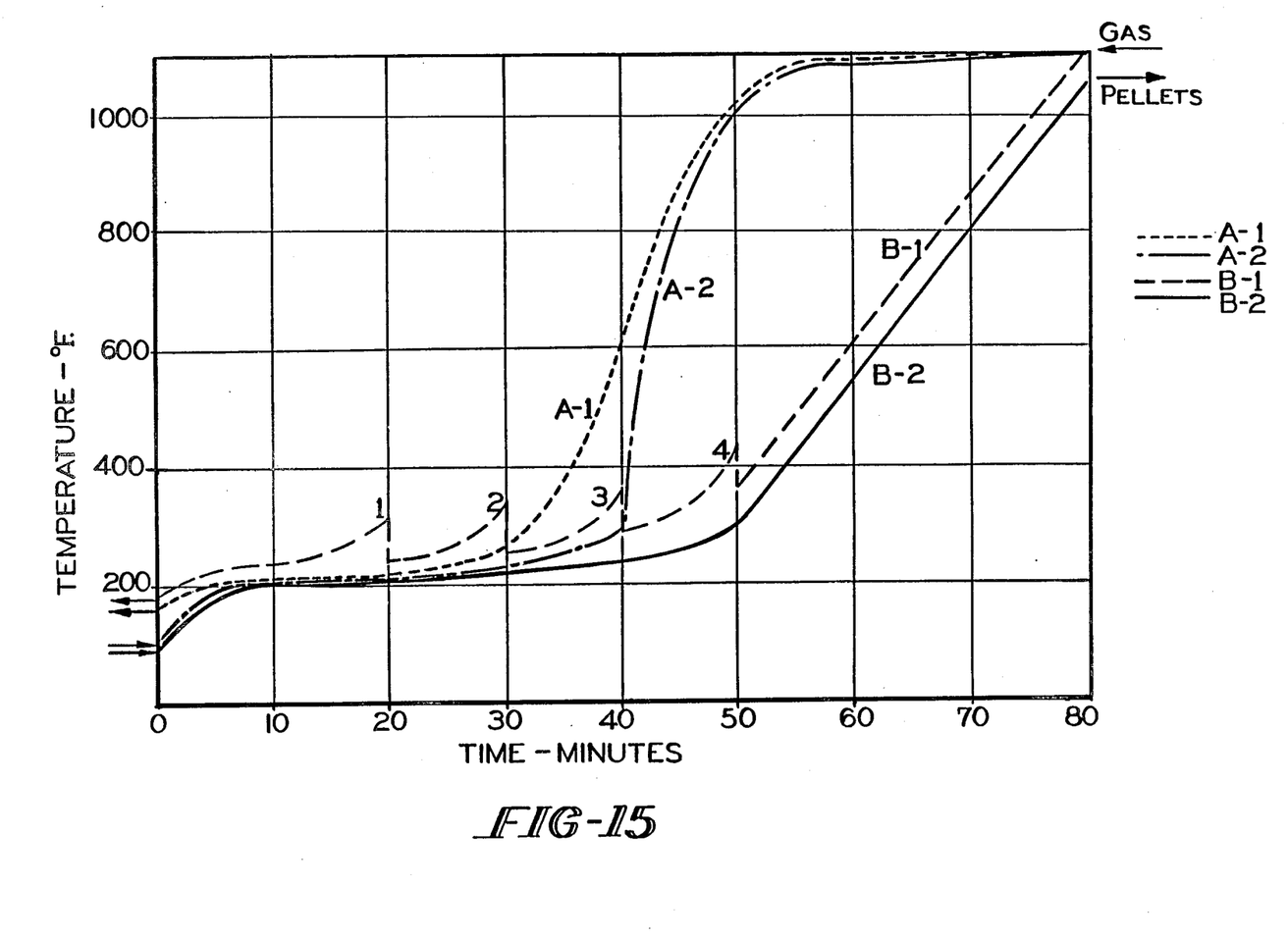
FIG. 15 is a graphical representation of the temperature of the surface of the solid pellets as they progress through the dryer apparatus versus the temperature of the drying and heating gas as it moves countercurrent to the pellets through the dryer, curves A showing the undesired temperature differential which occurs in prior art static bed-type dryers and curves B showing the temperature differential achieved by the present invention.

The effect of distributing hot gas in the novel dryer of this invention is shown in FIG. 15 which shows the plot of temperature with time for pellets (Curve A-2) contacted with hot gases in a conventional counter-current static dryer where pellets are fed at the top and heating gas is fed solely at the bottom. Curve A-1 shows the temperature of the heating gas corresponding to the pellet temperature. In addition, FIG. 15 also shows the pellet (Curve B-2) and gas temperatures (Curve B-1) for drying pellets in the novel static dryer of this invention.

Curve A-2 shows an initial period from 5 to 20 minutes of inactivity in the temperature of the pellets after the pellets are introduced into the dryer because no additional available heat remains in the gases within the pellet bed. From the time period 20 to 40 minutes the available heat in the hot gases within the pellet bed increases rapidly due to the increasing temperature difference between the hot gases and the cool moist pellets. Heat transfer is thereby accelerated to allow pellets to explode due to formulation of superheated steam within the pellets. The rapid rate of pellet temperature continues after dehydration is completed from 40 to 50 minutes because of countercurrent contact with hot feed gas entering below the grate until the temperature differential between the pellets and the gases again becomes negligible thereby inducing further inactivity in heat transfer over the time period 50 to 80 minutes. Pellets may spall or crack during the rapid rate of temperature changes from 40 to 50 minutes because of strain due to excess thermal gradients.

Curve A-2 shows an initial period from about 5 to 20 minutes of inactivity in the temperature of the pellets after the pellets are introduced into the dryer because no additional available heat remains in the gases within the pellet bed. For materials not susceptible to disintegration by thermal strain, this increased rate of temperature change is of no consequence, but in pellets of the type described herein which are highly susceptible to disintegration due to excessive thermal strain, this rapid temperature differential will increase to a level that permits the dangerous buildup of internal pressure within the pellets, which usually results in explosions and thermal spalling. These A plots are based upon the use of approximately one inch diameter generally spherical pellets having a volumetric heat transfer coefficient of 0.4 BTU/Ft$^2$-°F.-MIN. and a heat capacity of 30 BTU/FT$^3$-°F.

With further reference to FIG. 15, curve B-2 shows the temperature of the pellets throughout pellet bed 125 over a period of about 80 minutes, with the corresponding heated gas temperature (B-1) for a static dryer 99 of the present invention. There are four levels of lateral hot gas ducts 124 which distribute hot gases to the bed at levels when the pellets have been in the bed at periods of about 20, 30, 40, and 50 minutes. At these points, the temperature of heating gas increases appreciably sharply, as indicated at points 1,2,3 and 4 on curve B-1, and the temperature then decreases as the heat from the gas is distributed to the pellet bed 125.

In the novel dryer of this invention, where close control of the temperature differential is effected, inactive bed phases are avoided so that from approximately 5 to 50 minutes the bed is experiencing generally uniform dehydration and from approximately 50+ to 80 minutes the bed is experiencing generally uniform heating. The exponentially declining value of the temperature differential between the gas and the solid pellets is incrementally expanded by the injection of additional hot gas into the pellet bed at these preselected bed heights and preselected bed locations across the cross-section of the pellet bed. The effect of controlling the temperature differential between the surface of the solid pellets and the countercurrent heating and drying gas is evident when the temperature profiles for the gases and the pellets are compared in the hydration zones for plots A and B.

It is apparent that with higher water content of the individual pellets, a higher temperature differential between the gas and the pellets in the dehydration zone of the pellet bed must be provided to accomplish the volatization of the water during the desired time interval allocated to dehydrate the pellets in the dryer. With a drying apparatus of the design disclosed herein pellets with only 5% by weight of water content can normally be dehydrated in approximately 40 minutes with a temperature differential of about 20° F. whereas pellets with a 15% by weight water content have typically required a temperature differential of approximately 60° F. to effect volatilization of the water during the same time period. The optimum temperature differential appears to be approximately 50° F., but may range from about 5° to about 120° F.

It should also be noted that varying the diameter of the pellets to be dried and preheated will affect the time and temperature required to effect the volatilization of water. If the dryer is operated with the same temperature differential between the drying gas and the pellets, the total retention time that the pellets spend within the dryer can be reduced in proportion to the pellets size. A typical pellet bed retention time for pellets of approximately 1 inch diameter is 120 minutes.

It should also be noted that with a smaller dryer bed cross-section, the height of the bed of pellets (measured from the pellets resting on the top flat surface 121 of the lower grate 114 to the very top of the pellets beneath the augers 102) must be increased to meet retention time requirements. Bed cross-section and water content by weight of the individual pellets are factors which influence the drying gas flow velocity through the bed.

A change in the cross-sectional area of the pellet bed will produce a change in the pressure drop that occurs within the pellet bed from top to bottom. Pressure drop through the bed of pellets increases inversely as the square of the pellet bed cross-sectional area changes since the drying gas must flow at higher velocity through a smaller cross-sectional bed that correspondingly is also deeper to maintain a fixed or relatively constant pellet bed retention time.

Novel layered spherical pellets produced by the process of the present invention have a controlled range of particle sizes. The pellets are of a homogeneous composition in which segregation of components such as $Na_2O$ is minimized. The pellets are non-cohesive so that each pellet can float independently on molten glass. The novel layered spherical pellets have a specific gravity in the range of from about 1.90 to about 2.30, and preferably from about 2.00 to about 2.20. These high densities result in the layered pellets having good thermal conductivity. However, the density of the pellets is less than that of the glass melt so that the pellets melt on the surface of molten glass without sinking into the molten glass thereby optimizing heat transfer in the glass production process. The layered pellets melt at temperatures below which substantial amounts of pollutants such as nitrogen oxides are generated from the glass melt. The novel layered spherical pellets are non-hygroscopic and can be stored for extended periods of time without clumping or agglomerating. Crushing strengths are in the range of from about 50 to greater than 250 pounds and provide the pellets with sufficient hardness so that additional handling will not produce significant amounts of dust or fine particles. In addition, the pellets are resilient and can be dropped onto hard surfaces without splitting or shattering.

The following examples are intended to further illustrate the process of the present invention and are offered without any intent to pose any limitations upon the present invention.

EXAMPLE 1

A drum, cylindrical in shape, 30.5 centimeters in diameter and 25.4 centimeters long and having a sealed flat bottom was mounted on a flange so that the drum axis was horizontal. The flange was attached to the horizontal output shaft of a motorized speed reducer geared for an output shaft speed of 29 rpm. The other end of the drum was fitted with a conical restriction terminating in an access opening 15.2 centimeters in diameter. The interior of the drum was fitted with 12 radial flights 2.5 centimeters in height secured at points approximately equidistant around the interior wall. As the initial seed bed, about 4.5 kilograms of screen pellets about 6.5 millimeters in diameter were loaded into the drum, a mixture of screened sand (+0.42 mm) and finely pulverized limestone was prepared in amounts which provided a $SiO_2$ ratio to CaO of 72:13. The mixture was added to the drum in 1.125 kilogram increments. Heat was provided by a gas-oxygen torch burning liquified petroleum gas (LPG) whose flame was projected into the interior of the drum through the upper portion of the 15.2 cms. access opening. A 50 percent caustic solution was projected horizontally into the drum in the lower portion of the access opening and at an angle with respect to the drum axis to allow caustic impingement near the mid-point of the cascading bed inside the drum. Caustic projection was by feeding the caustic at a regulated rate into an air stream of sufficient velocity to break the liquid into droplets and to project these droplets about 20.3 cms. into the interior of the drum before contacting the cascading dry solids and recycle pellets. The caustic solution was fed to the drum in amounts which provided a ratio of $SiO_2$ to $Na_2O$ of 72:15 to the glass batch feed. The bed temperature was in the range of 90° to 100° C. The pelletization process was run with the drum rotating at 29 rpm until a total of 9 kilograms of the sand-limestone feed mix had been fed to the drum. The central portion of the access opening between the flame and the caustic spray provided access for intermittent manual additions of dry feed. Excess material inside the drum, due to buildup of the bed, was allowed to spill out of the access opening into a pan. The material was screened and undersized material returned to the drum through the access opening. $CO_2$ present in the combustion gas contributed to the carbonation of the caustic in the feed. The time required to pelletize 9 kilograms of feed mix was about 2 hours. At the end of the pelletization run, 6.75 kgs. of pellets were recovered along with 2.25 kgs. of unpelletized fines. The layered pellets were dried. The dry layered pellets produced were sufficiently hard so that they could not be crushed by hand. Pellet sizes in the product were in the range of from 3 to 16 millimeters in diameter. Due to the short length of the drum, the pelletization and drying zones in this example were actually super-imposed onto one another. Recycle was therefore not required. While this tended to impair the degree of controllability of bed moisture for maximum pellet strength, the pelletized product exhibited sufficient strength for subsequent pre-heating without breaking.

EXAMPLE 2

A dry blend of glass batch ingredients was prepared having the following composition:

| Component: | Sand | Dolomite | Feldspar | Salt Cake | Total |
|---|---|---|---|---|---|
| % by weight: | 70.6 | 21.2 | 7.1 | 1.1 | 100.0 |

Pelletizing apparatus of the type illustrated in FIG. 6 was employed having a pelletizing zone, a drying zone and a conical classification zone. The apparatus was 45.7 cms. in diameter and 152.4 cms. long. A stationary scraper blade supported on a tubular axle coinciding approximately with the axis of the apparatus was provided to limit the buildup of glass batch materials on the inner wall of the pelletizing zone and drying zone. A detached flight cage, also supported by the tubular axle, was employed having a diameter slightly smaller than the internal diameter of the pelletizing apparatus to provide clearance for the scraper blade. The flight cage rested on the bottom side of the pelletizer and rotated with the pelletizer to induce cascading of the pellets which remained enmeshed with the cage. Attached to the discharge end of the pelletizer was a burner for gaseous fuels to provide the hot combustion gases necessary for heating the bed of pelletized solids and for volatilizing water.

The pelletizer was loaded with a 13.5 kilogram bed of pellets 3 to 8 millimeters in diameter. The dry blend was fed continuously onto the revolving bed in the feed end of the pelletizer. Also sprayed continuously onto the revolving bed was a 50 percent aqueous solution of NaOH at a rate of 0.9 kgs. per 2.54 kgs. of dry blend. An axial inclination of the pelletizer of 0.23 cms. per meter transported the pellets progressively from the feed end to the discharge end of the pelletizer. A major portion of the pellets reaching the recycle zone entered the spiral conveyor and were recycled to the pelletizing zone. The remaining pellets overflowed into the conical classification zone and were collected as product at the discharge end. The pellet bed temperature was maintained in the range of 45° to 55° C. Water fed in association with the 50 percent NaOH solution was volatilized at rates in the range of 3.2 to 6.75 kilograms per hour. Dry blend feed rates allowed by these water evaporation rates ranged from 32 to 45 kilograms per hour. Under conditions of excessive drying of the pellet bed, supplemental additions of water were made with the caustic solution to maintain pellet moisture levels in the range of 6 to 8 percent.

The size of the spherical pellets produced ranged from 8 to 15 millimeters in diameter. The pellets were too hard to be crushed or deformed by finger pressure. Pellets dropped onto hard surfaces from heights of 20.3 to 25.4 cms. remained intact and exhibited resiliency.

EXAMPLE 3

A dry blend of glass batch ingredients was prepared having the following composition:

| Component: | Sand | Aragonite | Feldspar | Salt Cake | Total |
|---|---|---|---|---|---|
| % by weight | 70.6 | 21.2 | 7.1 | 1.1 | 100.00 |

Aragonite is a mineral form of calcium carbonate. Using the apparatus and procedure of EXAMPLE 2, a 50 percent NaOH solution and the dry blend were continuously fed into the pelletizer in amounts of 0.9 kg. of NaOH per 2.54 kgs. of dry blend. Pellet bed operating temperatures in the range of 40° to 45° C. were found to be most conducive towards the growth of pellets with satisfactory strength. At these temperatures, the volatilization rate of water was about 5 lbs./hr. Dry blend feed rates employed at this water evaporation rate were in the range of 40 to 60 lbs./hr. Pellets produced having a moisture content in the range of 6 to 8 percent were firm and hard. Pellets produced having moisture concentrations of 9 to 10 percent were sufficiently soft to be deformed by finger pressure, but were still sufficiently strong to endure the cascade in the drying section of the pelletizer without deformation or breaking.

EXAMPLE 4

The pellets produced during the operations described in EXAMPLES 2 and 3 were placed on a steel grate in the bottom of a square steel enclosure measuring 30.5 centimeters on each side to form a bed of pellets 30.5 cms. deep. Attached to the side of the enclosure below the grate was a burner of sufficient capacity to develop combustion gas temperatures in combination with secondary air in the range of 150° to 500° C. The burner and the enclosure below the grate were completely enclosed to force the flow of heated combustion gases upward through the grate and through the bed of pellets. Thermometers were located immediately below the grate and also in the uppermost layer of the bed to measure the temperatures of the gases and the pellets.

The bed, containing pellets measuring about 1.3 cms. in diameter and having an initial moisture content in the range of 6 to 8 percent, was completely dehydrated when heated to 300° C. in 1 hour. A second bed of pellets measuring about 1.6 cms. in diameter and having the same moisture content, was completely dehydrated when heated to 300° C. in 1.5 hours. A third bed of pellets in the size range of 1.9 cms. to over 2.54 cms. required up to 2.5 hours for complete dehydration by heating to 300° C. Heating rates more rapid than those indicated above resulted in spalling and explosion of some pellets due to the buildup of vapor pressure within the pellets in excess of atmospheric and also due to excessive strain due to the high thermal gradients from the surface of the pellets inward. Pellets dehydrated and preheated at the above heating rates were hard and strong. Anhydrous pellets dropped from a height of 1.8 to 3 meters onto a hard surface rebounded 10 to 30 percent of the distance dropped without breaking, indicating characteristics of strength, hardness, rigidity, and elasticity.

EXAMPLE 5

The specific gravity and crushing strength were determined for layered spherical glass batch pellets produced by the process of Example 2. The glass batch pellets had the following composition:

| Component | Sand | Dolomite | Feldspar | Salt Cake |
|---|---|---|---|---|
| % by weight | 70.6 | 21.2 | 7.1 | 1.1 |

In determining the specific gravity, the average diameters of pellets of known weight were determined by direct measurement with calipers of the diameters of eight different areas of each pellet. The specific gravity was found to be 2.07 grams per cubic centimeter. Crushing strength was determined on a Hounsfield Tensometer and found to be in the range from 120 to over 250 lbs.; 250 lbs. being the upper limit of the instrument. In addition, four pellets were analyzed to determine the concentration of Na$_2$O in the core and at the surface of the pellet. The results were as follows:

|  | 1 | 2 | 3 | 4 | Avg. |
|---|---|---|---|---|---|
| % Conc. of Na$_2$O(core) | 15.11 | 13.73 | 14.12 | 14.11 | 14.26 |
| % Conc. of Na$_2$O(surface) | 14.29 | 13.85 | 13.69 | 13.53 | 13.84 |
| (analytical accuracy limits: 0.5–1.0%) | | | | | |

The above determinations show that the novel pellets of the present invention have excellent crushing strengths and high densities as desired. The pellets have a homogeneous composition and there is no indication of significant migration of Na$_2$O from the core of the pellets to the surface.

EXAMPLE 6

The specific gravity and crushing strength of layered spherical glass batch pellets, prepared by the process of Example 3 and using the composition of Example 3 in which aragonite is the calcium carbonate source, were determined. The specific gravity was determined by the procedure used in Example 5 and was found to be 2.13 grams per cubic centimeter. Pellet crushing strengths in the range of 50 to 90 lbs were determined using the Hounsfield Tensometer and the procedure of Example 5.

EXAMPLE 7

Layered spherical glass batch pellets were prepared using the glass batch composition of Example 2 in which calcite was substituted for dolomite as the calcium carbonate source; the composition having the same weight ratio of components. The specific gravity was measured by the method of Example 5 and found to be 2.17 grams per cubic centimeter. Pellet crushing strengths were in the range of 120 to over 250 lbs when determined by the method of Example 5.

While the preferred structure and process in which the principles of the present invention have been incorporated as shown and described above, it is to be understood that the invention is not to be limited to the particular details thus presented, but in fact, widely different means may be employed in the practice of the broader aspects of this invention.

Having thus described the invention, what is claimed is:

1. Apparatus for producing and drying layered pellets for glass production comprising in combination:
   a. a rotary drum with a pelletizing zone, a drying zone, a recycle zone and recycle means to recycle undersized pellets from the recycle zone to the pelletizing zone, the pelletizing zone being adapted to maintain a moving bed of recycled pellets and feed thereinto sand, particles of a calcium carbonate source and a Na$_2$O source comprised of sodium hydroxide which coat the recycled pellets to form product pellets and;
   b. a dryer for drying the product pellets having a dryer frame with an infeed area, a bottom receiving area up through which a drying medium is forced, an outlet, and an improved grate system integral with the bottom receiving area having first and second stationary generally vertically spaced apart portions separated by the third movable pellet transferring portion with a predetermined number of openings of predetermined area therein to permit pellets to selectively pass therethrough, the first and second stationary portions each having laterally spaced apart passages therein, the spaced apart passages of the first stationary portion being laterally offset from the spaced apart passages of the second stationary portion, the first stationary portion further overlying the second stationary portion and the third movable pellet transferring portion such that at least one half of the predetermined area of the pellet transferring portion openings is covered at any time, the uncovered pellet transferring openings being underlain by the second stationary portion so that the pellets are supported thereby until the third movable pellet transferring portion is moved laterally to thereby scrape the pellets into the passages in the second stationary portion to permit the pellets to exit the dryer through the outlet while additional overlying pellets descend to fill the pellet transferring openings of the third movable pellet transferring portion.

2. The apparatus according to claim 1 wherein the grate system further comprises channels for passing hot gases upwardly through the pellets.

3. The apparatus according to claim 1 wherein the third movable portion further comprises a series of boxlike grids, at least two of the opposing sides of said boxlike grids forming vertically extending partitions effective upon movement of the third movable portion to direct pellets into the passages of the second stationary portion for exit through the outlet of the dryer.

4. The apparatus according to claim 3 wherein the first stationary portion further comprises a plurality of laterally spaced apart inverted V-shaped elements defining the laterally spaced apart passages, each element having a pair of angled sides effective to direct pellets into the laterally spaced apart passages.

5. The apparatus according to claim 4 wherein the infeed area further comprises pellet feed distribution apparatus which ensures uniform distribution of the pellets across the grate system.

* * * * *